FIG-3-

United States Patent Office 3,851,026
Patented Nov. 26, 1974

3,851,026
METHOD OF MAKING FLUID
PURIFICATION DEVICE
Donald E. Heskett, Villa Park, and John B. Heskett,
Lombard, Ill., assignors to Morton-Norwich Products,
Inc.
Continuation of application Ser. No. 86,043, Nov. 2,
1970, now abandoned, which, in turn, was a division
of application Ser. No. 581,507, filed on Sept. 23, 1966,
now Pat. No. 3,538,020, dated Nov. 3, 1970, which
was a continuation-in-part of application Ser. No.
490,802, filed Sept. 28, 1965, now abandoned. This
application Apr. 2, 1973, Ser. No. 346,965
Int. Cl. B29d 23/03
U.S. Cl. 264—54
7 Claims

ABSTRACT OF THE DISCLOSURE

A method of making a fluid treating device having a generally porous body of closely spaced surface-active fluid treating aggregate particles which are freely exposed for contacting fluids to be treated therewith which particles are bound together by a matrix formed from liquid reactants which are cured to form a polyurethane binder. A blowing agent, for example, water, which produces gas generation by chemical reaction with the liquid reactants is applied to the surface of the aggregate particles which are then combined with the liquid reactants and then confined in a suitable product-defining mold. The liquid reactants are then cured, producing gas generation at the surface of the aggregate particles by chemical reaction of the blowing agent and liquid reactants, and resulting in the surfaces of the aggregate particles in the fluid treating device being substantially free of the polyurethane binder.

This application is a continuation of application Ser. No. 86,043, filed on Nov. 2, 1970 and now abandoned, which, in turn, was a continuing application, specifically a divisional application, of our then copending application Ser. No. 581,507, filed on Sept. 23, 1966 and issued on Nov. 3, 1970 as U.S. Pat. No. 3,538,020 which copending application was a continuation-in-part of our then copending application Ser. No. 490,802, filed Sept. 28, 1965, and entitled "Fluid Purification Device and Method of Producing Same," now abandoned.

The present invention generally relates to a novel method of making an improved fluid purification device. More particularly, this invention concerns a novel method of making an improved fluid treating device characterized by a plurality of closely packed aggregate particles bound together or entrapped in a matrix or binder formed from a liquid which can be reacted or otherwise changed to a solid by application of heat, water, other chemicals or any combination thereof. In this regard, an important embodiment of the present invention specifically concerns a fluid treating cartridge having a porous body of closely packed fluid treating aggregates (i.e. charcoal granules, ion exchange resin beads, and the like) which are bound together or entrapped in a porous polyurethane matrix.

As used in the specification and claims, the term "fluid treating cartridge" is intended to cover both filtering and treating devices. In this regard, it is important to note that the fluid treating cartridges of this invention find practical utility in the removal of particulate matter, odors, and other contaminants from both liquids and gases.

It is an important object of the present invention to provide a method of making a new and improved fluid treating device characterized by a body of closely packed aggregate particles bound together or entrapped in a porous matrix wherein substantially all of the surface area of such aggregate particles is freely exposed for contacting a liquid or gas to be treated therewith.

Another important object of the present invention is to provide a method of binding or entrapping a body of closely packed aggregate particles in a manner wherein essentially the entire surface area of such aggregate particles is freely exposed for contact with a liquid or gas to be treated.

Another object of the present invention is to provide a method of making an improved fluid treating cartridge of high structural strength in which a plurality of fluid treating aggregates are arranged in a closely packed relationship which closely approximates the packing which such aggregate particles would have in a loose bed fluid treating device.

Another object of the present invention is to provide a method of binding or entrapping aggregate particles in abutting relationship with each other wherein only a very minor portion of the surface area of such particles is covered by the binding or entrapping medium.

Another object of the present invention is to provide a method of binding or entrapping a plurality of fluid treating aggregate particles such as ion exchange resin beads, activated charcoal, manganese greensand, sawdust and like materials in closely packed and abutting relationship with each other by forming a matrix in situ in the interstices between such fluid treating aggregate particles which matrix occupies a small fraction of the interstitial volume between such aggregate particles to provide a generally porous body.

Other objects will be apparent from the following detailed description taken in conjunction with the accompanying drawing and photomicrographs wherein.

Figure 1:
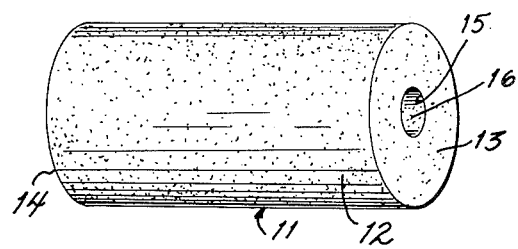
FIG. 1 is a perspective view of a fluid treating device embodying principles of the present invention.

The materials which can be used to form the matrix or aggregate binding medium in the practice of the present invention can generally be described as those liquid polymeric materials which can be reacted or otherwise changed to provide a solid structure by application of heat, water, other chemicals, or any combination thereof. In this regard, it has been found that the urethane prepolymers are particularly suitable since when used in amounts called for by this invention, they provide a polyurethane binding medium which covers only a very minor percent of the surfaces of the aggregate particles, leaving them substantially free for contact with fluids to be treated. These urethane prepolymers are well known, however, a general description thereof is found in United States Letters Patents Nos. 3,024,207 and 3,094,494 as well as in Hydrocarbon Processing and Petroleum Refiner, November 1962, vol. 41, No. 11 (pp. 171–179), and February 1963, vol. 42, No. 2 (pp. 123–134). Any of the well known techniques for synthesis of the polyurethanes can be used, such as the "prepolymer method" as well as the "quasi prepolymer method" and "one shot system."

Examples of commercially available urethane prepolymer resins which can be used in forming the particle entrapping or aggregate binding porous matrix of the present invention include a Simoniz Co. prepolymer and Nopco Chemical Co. prepolymers SX-159D, #H-102-N-T and P-502-T. The Simoniz prepolymer is a prepolymer resin prepared by mixing 444.8 parts, by weight, of Pluronic L-61, hydroxyl number 50.5 [having the general formula $HO(C_2H_4O)_a(C_3H_6O)_b(C_2H_4O)_cH$] with 63.5 parts, by weight of PPG-400, hydroxyl number 288.8 (a polypropyleneglycol having a molecular weight of about 400), and then combining this polyol mixture with 235 parts, by weight, of toluene diisocyanate (See United States Letters Patent No. 3,103,408). Nopco SX-159D is a prepolymer resin prepared by reacting polyoxypropylene glycols, having a molecular weight of from 1000 to 4000, with toluene diisocyanate, the toluene diisocyanate being present in a sufficient quantity to produce a reaction product having excess isocyanate groups. Nopco #H-102-N-T is a prepolymer resin prepared by reacting polyoxypropylene glycols having molecular weights of from 100 to 1000 with toluene diisocyanate, which is present in quantities sufficient to produce a reaction product having excess isocyanate groups. Similarly, Nopco P-502-T is prepared by reacting toluene diisocyanate with castor oil, the toluene diisocyanate being present in quantities sufficient to provide a reaction product having excess isocyanate groups.

It is important to note that while the "prepolymer," "quasi prepolymer" and "one shot system" methods of synthesis are primarily directed to the forming of foam bodies, that the matrix or entrapping medium of the present invention does not resemble the typical polyurethane foam cell structure, viz. a cell structure which is more or less characterized by dodecahedra with pentagonal sides and thin cell walls occupying the planes of each pentagon.

Examples of other polymeric systems which may be used in the forming of the particle entrapping matrices of the present invention include the epoxy, foamable, two-component liquid systems, the phenolic foamable resins, as well as the polyvinyl formal polymeric systems. In the above mentioned epoxy, foamable, two-component liquid systems, the polymers are condensation products of bisphenol A and epichlorohydrin, e.g., diglycidyl ether of bisphenol A. The curing agents for these systems are polyamines such as diethylene triamine, triethylene tetramine and heat. The phenolic foamable resinous polymers mentioned above are condensation products of phenol or phenol derivatives with aldehydes, primarily formaldehyde. The condensation is both acid and base catalyzed. Different degrees of cross linking can be achieved by varying the ratios of the formaldehyde and/or the type of catalyst. Combinations of phenolic resins (resoles) with polyurethane prepolymers are possible. In polyvinyl formal polymeric systems, the polyvinyl alcohol can be insolubilized in aqueous solutions by reaction with formaldehyde in the presence of an acid catalyst.

If desired, different urethane prepolymers or other polymeric systems may be combined to provide particle entrapping matrices which are specifically tailored to particular aggregate systems and fluid treating services. Illustrations of such conjoint use of different urethanes are given in certain of the examples. In this regard, it should be noted that equivalent polymeric systems exhibiting properties and characteristics similar to the above-mentioned urethane and other polymeric systems can be used in the practice of the present invention. Also, the addition of various catalysts and cross-linking agents in conjunction with the matrix-forming polymeric systems of the present invention can be advantageously employed to modify these systems in a desired manner. Such catalysts and cross-linking agents are well known in the art and are generally described in the above identified U.S. patents and publications.

The aggregate particles which can be used in the fluid treating cartridges of the present invention include all those which are conventionally used in fluid treating operation. For example, ion exchange resin beads, activated charcoal, manganese greensand, sawdust, and the like can be used either alone or in combination as the aggregate constituent of these cartridges. Furthermore, the present invention is not generally limited to specific particle sizes for the aggregates and the selection of a suitably sized aggregate for a given cartridge will be determined more by the nature of the aggregate and the intended service of the fluid treating cartridge. In most instances, however, it is generally preferred to use aggregates having relatively small particle sizes in order to provide greater surface area for contacting fluids to be treated. Insofar as the effect of aggregate particle size on the amount of matrix-forming reactants is concerned, it should be noted that various fluid treating cartridges have been made with activated charcoal aggregates having a particle size ranging from 20 mesh to 200 mesh without substantial difference in the range of the urethane prepolymer concentration. Similarly, ion exchange resin cartridges with ion exchange resin beads of 16 x 50 mesh require substantially the same amount of prepolymer as do cartridges made with ion exchange resin beads having a particle mesh size of 50 x 100.

As noted above, a plurality of aggregates of widely varying sizes and/or types can be combined in a single fluid treating cartridge to provide conjoint treatment to a liquid or gas treated therewith. For example, cartridges having an aggregate constituent composition of 75% of 30 x 80 mesh activated carbon and 25% of 100 x 200 mesh activated carbon have been advantageously made along with cartridges which use a composite aggregate formed from ion exchange resin beads, activated charcoal and manganese greensand (see Example 13). Thus, the aggregate binding techniques of the present invention offer the important advantage of enabling the production of a wide variety of cartridges which are particularly suited to special and unique fluid treating services.

Referring to the drawings and with particular reference to FIG. 1, the numeral 11 generally designates a fluid treating cartridge of the present invention having an outer surface 12, a pair of opposed end walls 13, 14 and an inner wall 15 which defines a hollow core 16. The tubular configuration of the fluid treating cartridge shown in FIG. 1 is particularly suitable for treating liquids. It will, of course, be appreciated that the fluid treating devices of the present invention can be formed in any desired shape and, accordingly, are not limited to the particular shape shown in FIG. 1.

Figure 3:
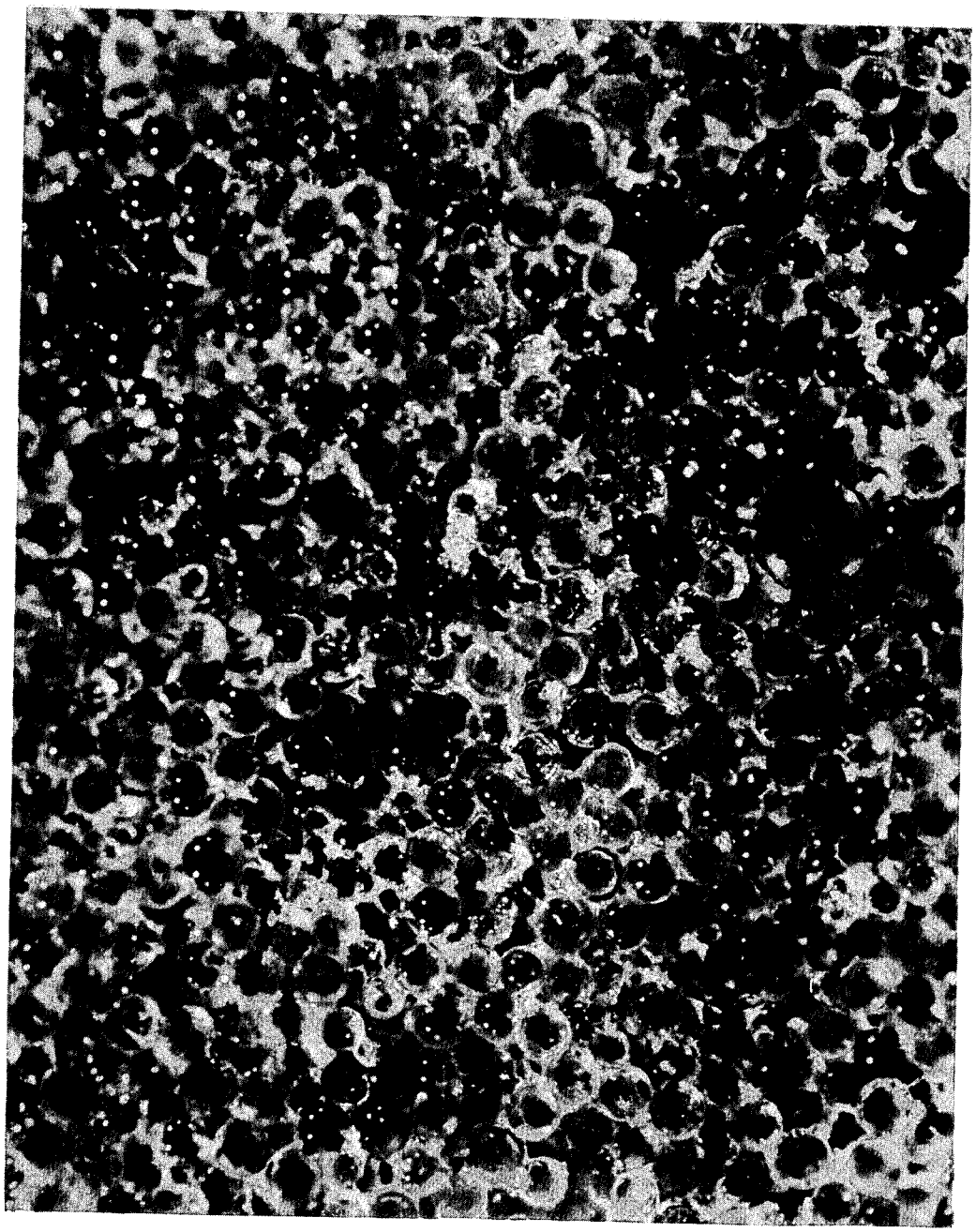
FIG. 3 is a photomicrograph depicting by 10× magnification an ion exchange resin bead cartridge made in accordance with the present invention.
Figure 4:
FIG. 4 is a photomicrograph depicting by 10× magnification an activated carbon cartridge made in accordance with the present invention.
Figure 5:
FIG. 5 depicts by 10× magnification a second activated carbon cartridge made in accordance with this invention.

The structural configuration of the aggregate particles and polymeric matrix of the products of the present invention are best depicted by the photomicrographs of FIGS. 3, 4 and 5 which are described below.

Figure 2:
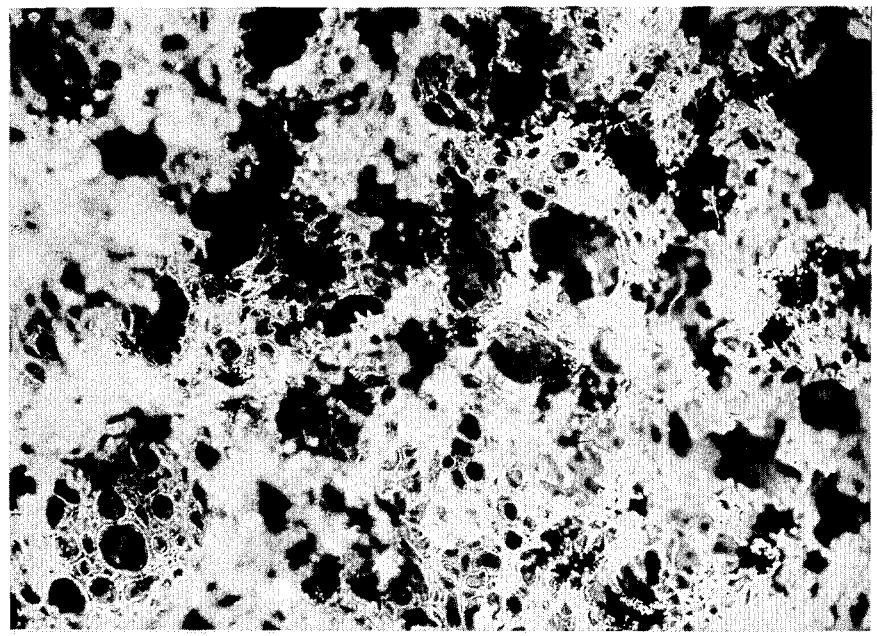
FIG. 2 is a photomicrograph depicting by 10× magnification a conventional polyurethane foam in which a plurality of cation exchange resin beads are randomly disposed.

FIG. 2 is a 10× magnification photomicrograph of a polyurethane foam body made in accordance with prior art teachings and is included in this disclosure in order to describe the present invention more clearly. The foam body depicted in this photomicrograph was made by adding 0.5 grams of a dimethylpolysiloxane silicone oil (DC-200,50 centistokes) to 160 grams of Simoniz Co. prepolymer and mixing with a spatula in a polyethylene lined paper cup. 240 grams of a 16 x 50 mesh cation exchange resin bead (sodium foam) were added to the polyurethane-silicone oil mixture and mixed therewith (this corresponds to a resin bead to polymer weight ratio 1.5 to 1). To this mixture 6 grams of a catalyst composed of approximately 2.2 parts by weight water, 1.2 parts by weight diethylethanolamine and 0.3 parts by weight triethylamine, were added and mixed with a spatula in a polyethylene paper container until foaming began. The foaming mixture was poured into a larger open polyethylene lined container and allowed to foam undisturbed to its full height. It was observed that the expansion of the urethane foam was not altered or directed in any specific path by the aggregate particles. As the foam expanded, it merely carried the particles further apart. The product had a density of 12 pounds per cubic foot. As is illustrated in FIG. 2, the major constituent in this foam body is the polyurethane foam itself in which the resin beads are randomly dispersed in spaced apart relationship with each other. Furthermore, major portions of the surface area of the resin beads have been covered and are unavailable for contact with any fluid medium which may be passed therethrough.

FIG. 3 is a 10× magnification print of a chloride form anion exchange resin bead cartridge, made in substantially the same manner as are the ion exchange resin bead cartridges of Examples 10 and 11. In this cartridge, 1,333 grams of 50 x 100 mesh anion exchange resin beads (chloride form) were used with 113.6 grams of a urethane prepolymer. Accordingly, the weight ratio of anion exchange resin beads to prepolymer was approximately 12:1. As is illustrated, the urethane polymer is shown to occupy only a small fraction of the interstitial volume between the closely packed aggregate particles so as to provide a generally porous body. Also, the polyurethane is shown to encircle some of the resin beads with lightly adhering strands of polyurethane which cover only a small fraction of the surface of such beads so that the surfaces thereof are substantially free for contacting a fluid to be treated.

FIGS. 4 and 5 are 10× magnification photomicrographs which illustrate carbon fluid treating cartridges made in accordance with the present invention. In particular, the photomicrograph of FIG. 4 depicts the carbon cartridge of Example 8. This cartridge was formed by extrusion and is composed of approximately 65%, by weight, of 20 x 40 mesh activated charcoal particles and 35%, by weight, of urethane prepolymer (weight ratio of charcoal to prepolymer approximately 2 to 1). The photomicrograph of FIG. 5 depicts a carbon cartridge molded in the same manner as is generally described in Examples 1–5. 2,100 grams of 30 x 80 mesh activated charcoal granules and 766.8 grams of urethane prepolymer (weight ratio of carbon to prepolymer approximately 3 to 1) were used. An examination of each of these carbon cartridges disclosed that the polyurethane matrix was primarily present where the carbon particles touched each other, however, there were instances where strands of polyurethane encircled some of the charcoal particles. In accordance with the present invention, the activated charcoal particles in each of the cartridges of FIGS. 4 and 5 are bound together or entrapped in closely packed relationship with each other with the interstitial volume between the closely packed aggregate particles being substantially open.

In generally describing the fluid treating devices of the present invention, it can be noted that they have a rigid porous body of closely spaced fluid treating aggregates which are bound together or entrapped by a polymeric matrix or binder formed in situ in the interstices between the aggregate particles. The distribution of the aggregate particles throughout the porous body is primarily a function of the size and shape of the respective aggregate particles. In other words, the aggregate particles are spaced essentially as they would be spaced when packed in a loose bed. As such, fluid treating cartridges of the present invention have a density which closely approximates the bulk density of the particular aggregate particles, for example, cartridges made with ion exchange resin beads having a density of about 50 pounds per cubic foot.

The polymeric matrix or binder occupies only a small fraction of the interstitial volume between the closely packed aggregate particles. Accordingly, it can generally be stated that the binder or matrix-forming constituents are employed in concentrations which will not substantially interfere with or separate the aggregate particles. Stated otherwise, the prepolymer or matrix-forming reactants are used in amounts which will form a particle entrapping matrix or binder having a volume less than the interstitial volume between the closely packed aggregate particles.

Certain of the advantages and characteristics of the products of the present invention are best understood by a description of the process of making the fluid treating devices thereof. A preferred method briefly involves mixing the binder or matrix-forming polymeric reactants with the aggregate particles and extruding this polymer-aggregate mass in the desired shape, with the addition of heat during the extrusion of the product and thereafter while the product is still in the extrusion tube to expedite curing of the polymeric matrix or binder. If desired, post curing can be accomplished by the addition of heat after the product has been removed from the extrusion apparatus.

In using certain aggregate materials such as, for example, charcoal, it has been discovered that a protectant can be advantageously employed to prevent deactivation of the surfaces of these aggregates during the matrix-forming step. This deactivation is believed to be due to the physical absorption of the prepolymer into the pores of the charcoal aggregate. Accordingly, it is desirable and preferred to add a suitable protectant such as water or some other agent to the charcoal prior to admixing of the charcoal aggregates with the polymeric reactants. In urethane polymeric systems, it has been found that pre-wetting the charcoal particles with approximately an equal weight of water provides significant improvements in carbon activity retention.

It is generally preferable in the practice of the method of this invention to obtain complete mixing of all materials in the early steps or first step of this process. In using urethane prepolymers as the matrix-forming constituent it has been found that the pre-wetting of the aggregates with the blowing agent results in the gas generation taking place predominantly at the interface between the prepolymer and the aggregate, thereby tending to separate the prepolymer from the aggregate. There is relatively little bubble formation within the polymer mass. Accordingly, a preferred technique involves first wetting the aggregate with water and then dispersing the urethane prepolymer in a more or less continuous phase over the surfaces of the thus wetted aggregate particles. However, if desired, the prepolymer can be admixed with the aggregate and then formed into the desired shape by molding or extrusion prior to the addition of water or some other blowing agent. In such cases the water can be subsequently added in the form of a liquid or as steam, while the prepolymer-aggregate mass is in the product defining mold or extruder. A catalyst and/or cross-linking agent, while not essential to the process, can be admixed with the aggregate either prior to, simultaneously with, or after the dispersing of the prepolymer on the surfaces of the aggregate particles. If desired, such catalyst and/or cross-linking agents can be discharged alone or with water, steam or other carrier into the shaped product while the same is in the mold or extruder. Alternatively, the aggregate can be first formed into the desired product shape and then the reactants discharged therein in any of the above mentioned sequences.

Fluid treating cartridges can be formed in the general shape shown in FIG. 1 by packing the aggregate and matrix-forming reactants into an open ended tube having an internal diameter which corresponds to the outer diameter of the intended product. In such operations, it has been found that clamping or sealing the ends of the thus packed aggregate-polymer mass is not essential since the amounts of the polymeric reactants employed generally will not impart substantial disruption to the aggregate packing. If desired, however, the end walls of the cartridge being formed can be held in place during the matrix-forming step, particularly where relatively large amounts of polymeric matrix-forming reactants are used.

The curing time for the polymeric binder or matrix can be altered and controlled by the selection of the reactants, the catalysts and cross-linking agents employed, and the processing temperatures. Heating of the aggregate-polymer mass can be done by placing the same in an oven, blowing steam or some other heating medium therethrough, through the use of high frequency induction heating with an alternating electric field or equivalent heating techniques. Similarly, if desired, the porous mass can be cooled by passing relatively cool air therethrough. This latter technique is particularly suited to packaging of these products immediately after manufacture.

An important aspect of the present invention concerns the relative amounts or concentrations of the aggregate particles and matrix-forming reactants. Generally stated, the amount of aggregate used in a given cartridge is that which is necessary to form the particular product when the aggregate particles are distributed in the closely spaced relationship characteristic of the present invention. Similarly, the amount of matrix-forming reactants or polymeric reactants contemplated by this invention, is that amount which will form a particle entrapping matrix or binder having a solids volume less than the interstitial volume between the closely packed aggregate particles. It can be appreciated therefore, that the relative amounts of these materials will be governed to a great extent by the shape, size, surface characteristics and nature of the particular fluid treating aggregates employed as well as the nature and characteristics of the polymeric reactants. In this regard, it can be generally stated that the aggregate content ranges, on a volume basis, contemplated by the present invention range from approximately 65% to 99.8% for corresponding prepolymer or matrix-forming reactant volumes ranging from 35% to 0.2%. In this regard, it should also be noted that the amount of prepolymer or matrix-forming reactant employed will be governed to a great extent by whether the matrix formed thereby is flexible, semi-rigid, or rigid. Generally, as the degree of rigidity increases, the amount needed will decrease. The use of cross-linking agents which increase the rigidity of the polymeric matrix, therefore tend to reduce the amount of prepolymer needed.

Water treating cartridges made in accordance with the present invention using charcoal aggregates having a particle size of from 20 mesh to 200 mesh are preferably composed of from 55% to 98%, by weight, of charcoal aggregate. Correspondingly, the preferred polymer range ranges from 45% to 2%, by weight. Otherwise expressed, it can be stated that the preferred weight ratio of charcoal to prepolymer in water treating devices made in accordance with this invention ranges from 2:1 to about 24:1. Expressed on a volume basis, these water treating devices are preferably composed of from about 80% to 99% charcoal and from about 20% to 1%, prepolymer.

Similarly, in water treating devices using ion exchange beads as the aggregate, the fluid treating devices of the present invention are preferably composed of from about 90% to 97%, by weight, of ion exchange resin beads and correspondingly, 10% to 3%, by weight, of prepolymer resin. Stated otherwise, the preferred weight ratio of ion exchange resin beads to prepolymer ranges from about 9:1 to 32:1. The above weight percentages correspond to 94.3% to 99.25%, by volume, of ion exchange resin and 5.7% to 0.8%, by volume, prepolymer. Along this line, it should be noted that the above described preferred ranges for ion exchange resins was found to not vary significantly in using ion exchange resin beads having an aggregate particle size of from 16 mesh to 100 mesh.

The following examples are set forth for purposes of illustration only and are not intended as limitations on the present invention. The percentage weight concentrations referred to in the following examples identify the weight of aggregate with respect to the total weight of aggregate and prepolymer resin.

EXAMPLE 1

An activated charcoal cartridge containing 95%, by weight, 20 x 40 mesh activated charcoal (Cliffchar, Cliff Dow Co.) was made by first mixing 380 grams of the activated charcoal with 187.5 grams deionized water in a one gallon working capacity Baker-Perkins mixer for 3 to 4 minutes. 20 grams of SX–159D were then added thereto with additional mixing for 3 minutes. This mixture was then hand packed in a 2.625 inch I.D. Pyrex glass tube and cured by passing steam therethrough. After curing, the cartridge was removed from the Pyrex tube and observed to exhibit excellent structural strength.

EXAMPLE 2

In this example, an activated charcoal cartridge containing approximately 74%, by weight, 30 x 80 mesh carbon was made by first pre-wetting 350 grams of the carbon with 626.5 grams of water containing 15 grams of "Quadrol" [a catalyst and cross-linking agent, N,N, N',N'-tetrakis(2-hydroxypropyl) ethylene diamine, Wyandotte Chemical Corp.] and then mixed with 127.8 grams of Simoniz Co. prepolymer in a Baker-Perkins mixer for about one minute. The mixture was then hand packed into a 24 inch x 2¾ inch I.D. Pyrex glass tube and steamed for about three minutes. This cartridge was found to reduce the chlorine content of Chicago water from 0.4 p.p.m. to less than 0.1 p.p.m. at a flow rate of approximately 1½ g.p.m.

EXAMPLE 3

The activated carbon cartridge of this example was made with 30 x 80 mesh activated carbon and Simoniz prepolymer; the finished cartridge had an activated carbon content of approximately 85%, by weight. In making the cartridge, 700 grams of 30 x 80 mesh activated carbon were mixed with 855 grams of water and 127.8 grams of the Simoniz prepolymer for about three minutes. The mixture was then hand packed into a 24-inch x 2.5 inch I.D. Pyrex tube and steam passed therethrough for about six minutes. A 9⅝ inch long x 2.5 inch O.D. x ½ inch I.D. cartridge made therefrom and when tested with Chicago water containing approximately 0.6 p.p.m. chlorine at a flow rate of approximately 1½ g.p.m. provided approximately 80% chlorine removal.

EXAMPLE 4

The cartridge of this example was prepared with 30 x 80 mesh activated carbon and Simoniz prepolymer; the activated carbon content of the cartridge was 60%, by weight. In making the cartridge, 700 gms. of 30 x 80 mesh activated carbon were first mixed with 467 grams of the Simoniz prepolymer in a Baker-Perkins mixer for approximately five minutes. This mixture was then packed into a glass tube of the same type identified above in Example 3, and steam passed therethrough for ten minutes. A cartridge of the same dimensions as that identified in Example 3 was then prepared therefrom and tested with Chicago water containing 0.6 p.p.m. chlorine. The cartridge provided approximately 80% chlorine removal.

EXAMPLE 5

The cartridge of the present example was made with 30 x 80 mesh activated carbon and 100 x 200 mesh activated carbon; on a weight basis, the cartridge contained 47% 30 x 80 mesh activated carbon and 25% 100 x 200 activated carbon. In making this cartridge, 248 grams of 30 x 80 mesh activated carbon were first mixed with 82 grams of 100 x 200 mesh carbon. 250 grams of water containing 15 grams of "Quadrol" were added to the activated carbon and thoroughly mixed therewith. The latter mixture was combined with 80.7 grams of the Simoniz prepolymer and 40.35 grams of Nopco prepolymer

H-102-N-T. A cartridge was made with this mixture by packing and steaming as identified in Example 3. The cartridge measured 9⅝ inches x 2.5 inches O.D. x ½ inch I.D. demonstrated better than 95% chlorine removal efficiency when tested with Chicago water containing approximately 0.56 p.p.m. chlorine.

EXAMPLE 6

The cartridge of this example was made by first combining 15 parts, by volume, of Nopco "SX-159D," 7 parts, by volume, of water and 78 parts, by volume, of a granulated charcoal (average grain size of from 0.025 to 0.05 inches). These materials were thoroughly mixed together so that all of the charcoal granules received a uniform coating of the "SX-159D" urethane prepolymer. Three drops of tetramethylbutyldiamine were then added and the mixture immediately transferred to an annular mold measuring 9⅞ inches in length, 2¾ inches in outer diameter and had a ¾ inch central hollow core. The volume of the mold was approximately equal to the total volume of the above ingredients in their unreacted condition. The walls of the mold were fixed so as to maintain the aggregate particles in an abutting relationship.

The mold containing these materials was then placed in an oven at a temperature of 175° F. for about one-half hour after which time the polyurethane was cured.

The filter cartridge was then removed from the mold and, after cooling to room temperature, was tested for effectiveness in removing objectionable taste and odors from drinking water. The results obtained with this charcoal cartridge favorably compared with those obtained with conventional charcoal cartridges of the type wherein charcoal granules are impregnated in a cellulose casing.

EXAMPLE 7

This example illustrates the making of an activated charcoal cartridge by an extrusion technique. The cartridge of this example contained 77%, by weight, of 20 x 40 mesh activated charcoal. In making this cartridge, 686.4 grams of 20 x 40 mesh activated charcoal (Cliffchar, Cliff Dow Co.) were mixed with 202.5 grams of Nopco "SX-159D" in a one gallon working capacity Baker-Perkins mixer for approximately five minutes and then transferred to the hopper of a "Hobart" meat grinding extruder. The mixture was extruded through the auger into an 8 inch long x 2¾ inch I.D. extrusion chamber at approximately one inch per minute while steam was fed into the extruding mass at approximately 8 pounds per hour through a ½ inch hollow mandrel. A section of the extruded cartridge five inches long by 2¾ inches O.D. by ½ inch I.D. was tested for chlorine removal in Chicago water containing approximately 0.6 p.p.m. chlorine at a flow rate of approximately three gallons per minute. The cartridge removed approximately 80% of the chlorine at this flow rate. It also removed smoke particles from cigarette smoke which were blown therethrough.

EXAMPLE 8

The cartridge of this example was also made by extrusion techniques and contained 64%, by weight, of 20 x 40 activated charcoal. In making this cartridge, 700 grams of 20 x 40 mesh activated charcoal were mixed with 400 grams of Nopco "SX-159D" in a Baker-Perkins mixer for approximately five minutes. Six such batches were prepared and fed continuously to the "Hobart" extruder mentioned above in Example 7 which was modified by extruding the mixture into a 14 inch long x 2¾ inch extrusion chamber at approximately 7½ inches per minute while steam was fed to the extruding mass at approximately 8 pounds per hour through the ½ inch mandrel. A 9⅝ inch x 2¾ inch O.D. by ½ inch I.D. cartridge thus produced was tested for chlorine removal from Chicago water at approximately a 2 g.p.m. flow rate. It reduced the chlorine content by about 65%. Another section which was extruded at about 12 inches per minute reduced the chlorine by about 50%.

EXAMPLE 9

This example illustrates the extrusion of a cartridge containing a composite aggregate composed of 30 x 80 mesh activated carbon and 100 x 200 mesh activated carbon. 1,575 grams of 30 x 80 mesh activated carbon and 525.6 grams of 100 x 200 mesh activated carbon were mixed with 255.6 grams of Nopco prepolymer P-502-T and 511.2 grams of Simoniz Co. prepolymer together with 1,500 grams of water and 90 grams of the catalyst and cross-linking agent "Quadrol." This mixture was then extruded as described above in Example 7.

The cartridge of this example was tested with Chicago water to determine its chlorine removal efficiency. The data tabulated below in Table 1 illustrates the performance obtained with the cartridge. A constant flow rate of 1.5 gallons per minute was used with the influent water having a chlorine content of approximately 0.55 parts per million. As is shown, the cartridge removed virtually all of the chlorine from the water for a total flow up to 180 gallons and exhibited excellent efficiency when the total flow therethrough was 1,035 gallons.

For comparative purposes, commercially available activated charcoal fluid treating cartridges were similarly tested in order to evaluate the performance data obtained with the cartridge of this example. Such comparative test data are set out below in Tables 2, 3 and 4.

TABLE 1.—DATA RE. CHLORINE REMOVAL WITH ACTIVATED CARBON CARTRIDGE OF THE PRESENT INVENTION (EXAMPLE 9)

| Total flow (gallons) | Flow rate (g.p.m.) | Water temperature, °C. | Pressure drop across cartridge (p.s.i.g.) | Chlorine content (p.p.m.) | |
|---|---|---|---|---|---|
| | | | | Influent | Effluent |
| 0 | 1.5 | 21.0 | 5.0 | 0.57 | 0.04 |
| 90 | 1.5 | 21.0 | 4.5 | 0.57 | 0.04 |
| 180 | 1.5 | 21.0 | 5.0 | 0.58 | 0.04 |
| 270 | 1.5 | 21.0 | 5.0 | 0.58 | 0.064 |
| 360 | 1.5 | 21.0 | 5.2 | 0.58 | 0.084 |
| 450 | 1.5 | 21.0 | 5.4 | 0.58 | 0.086 |
| 540 | 1.5 | 21.5 | 4.5 | 0.54 | 0.080 |
| 630 | 1.5 | 21.0 | 5.0 | 0.56 | 0.080 |
| 720 | 1.5 | 21.0 | 5.5 | 0.56 | 0.090 |
| 810 | 1.5 | 21.0 | 6.2 | 0.57 | 0.096 |
| 900 | 1.5 | 21.0 | 6.6 | 0.57 | 0.10 |
| 990 | 1.5 | 21.0 | 7.4 | 0.55 | 0.12 |

TABLE 2.—DATA RE. CHLORINE REMOVAL WITH ACTIVATED CARBON FILTER CARTRIDGE A

| Total flow (gallons) | Flow rate (g.p.m.) | Water temperature, °C. | Pressure drop across cartridge (p.s.i.g.) | Chlorine content (p.p.m.) | |
|---|---|---|---|---|---|
| | | | | Influent | Effluent |
| 0 | 1.5 | 22.5 | 9.4 | 0.56 | 0.05 |
| 90 | 1.5 | 22.5 | 4.0 | 0.56 | 0.065 |
| 180 | 1.5 | 22.5 | 4.8 | 9.55 | 0.063 |
| 270 | 1.5 | 22.5 | 5.0 | 0.55 | 0.065 |
| 360 | 1.5 | 22.5 | 5.4 | 0.56 | 0.065 |
| 450 | 1.5 | 22.5 | 6.0 | 0.56 | 0.093 |
| 540 | 1.5 | 22.5 | 6.6 | 0.56 | 0.100 |
| 630 | 1.5 | 22.0 | 6.0 | 0.49 | 0.075 |
| 720 | 1.5 | 21.5 | 6.4 | 0.55 | 0.093 |
| 810 | 1.5 | 21.5 | 6.8 | 0.56 | 0.093 |
| 900 | 1.5 | 21.5 | 7.2 | 0.58 | 0.100 |
| 990 | 1.5 | 21.5 | 7.5 | 0.58 | 0.110 |

TABLE 3.—DATA RE. CHLORINE REMOVAL WITH ACTIVATED CARBON FILTER CARTRIDGE B

| Total flow (gallons) | Flow rate (g.p.m.) | Water temperature, °C. | Pressure drop across cartridge (p.s.i.g.) | Chlorine content (p.p.m.) | |
|---|---|---|---|---|---|
| | | | | Influent | Effluent |
| 0 | 1.6 | 22.5 | 5.6 | 0.48 | 0.00 |
| 48 | 1.6 | 22.5 | 6.8 | 0.52 | 0.00 |
| 96 | 1.6 | 22.5 | 10.2 | 0.54 | 0.00 |
| 144 | 1.6 | 22.5 | 12.2 | 0.54 | 0.00 |
| 192 | 1.5 | 22.5 | 14.8 | 0.55 | 0.00 |
| 240 | 1.5 | 22.5 | 17.3 | 0.55 | 0.025 |
| 288 | 1.5 | 22.5 | 20.7 | 0.55 | 0.046 |
| 336 | 1.5 | 22.5 | 22.2 | 0.55 | 0.065 |
| 384 | 1.5 | 22.5 | 24.8 | 0.55 | 0.065 |
| 442 | 1.5 | 22.5 | 27.8 | 0.56 | 0.065 |
| 490 | 1.5 | 22.5 | 31.4 | 0.56 | 0.065 |

TABLE 4.—DATA RE. CHLORINE REMOVAL WITH ACTIVATED CARBON FILTER CARTRIDGE C

| Total flow (gallons) | Flow rate (g.p.m.) | Water temperature, °C. | Pressure drop across cartridge (p.s.i.g.) | Chlorine content (p.p.m.) | |
|---|---|---|---|---|---|
| | | | | Influent | Effluent |
| 0 | 1.5 | 25.0 | 1.3 | 0.78 | 0.1 |
| 80 | 1.5 | 24.5 | 1.4 | 0.53 | 0.12 |
| 202 | 1.5 | 24.5 | 1.0 | 0.605 | 0.244 |
| 280 | 1.46 | 24.5 | 1.0 | 0.74 | 0.36 |
| 463 | 1.43 | 23.5 | 1.3 | 0.78 | 0.24 |
| 845 | 1.5 | 23.5 | 1.8 | 0.54 | 0.28 |
| 1,333 | 1.4 | 23.5 | 1.4 | 0.53 | 0.29 |
| 2,242 | 1.4 | 23.5 | 1.6 | 0.60 | 0.32 |

The performance data for the commercial cartridge A is tabulated in Table 2. This cartridge was of the axial flow type and contained 380 grams of 20 x 40 mesh shell granular activated carbon. The cartridge was 9¾ inches long and measured 3 inches in diameter at its widest point and 2¾ inches at each of its ends. The center core was approximately 1 inch in diameter. Incorporated in the cartridge were a prefilter and postfilter composed of compressed cellulose fiber. It was rated for a flow of 1.5 gallons per minute and was held together with a plastic outer skin, with inlet holes at the top and a porous screen at the bottom on the wall of the center tube, with the center tube running the length of the filter.

Comparison of the date obtained with fluid treating cartridge A and that obtained with the cartridge of Example 9 indicates that the cartridge of the present invention is at least equivalent to relatively complex and expensive cartridge A at the higher capacities and that at lower capacities the cartridge of the present invention substantially out performed cartridge A. Also, higher pressure drops were encountered across cartridge A at lower total flow values than were obtained with the cartridge of the present invention.

The data of Table 3 was obtained with a commercial filter cartridge B, which was also of the radial flow type and used about 200 grams of a fine activated charcoal (around 100 x 200 mesh) heeld together by a binder. This cartridge had an outer filter of wool fiber which is intended to filter the water and retain any loose carbon that may break off from the bonded carbon body. The carbon in this cartridge is apparently mixed with a biinder and formed onto a center core tube made of a plastic screen. Filter paper is wrapped around the tube. The cartridge length measured 9¾ inches and 2¾ inches in O.D. and is rated at 1.5 gallons per minute. The filter is held together by the center tube which has a cap at each end made of a flexible plastic and a serrated outer screen, also of a flexible plastic.

Examination of the data of Table 3, shows that while cartridge B provides satisfactory chlorine removal for the total flow tested, the pressure drop across such cartridge is particularly high amounting to 31.4 p.s.i.g. when the total flow through such filter amounted to approximately 500 gallons. The pressure drop across the cartridge of the present invention for the same cumulative flow was approximately 5.0 p.s.i.g.

Commercial filter cartridge C, identified in Table 4, is also of the radial flow type and contains approximately 320 grams of 20 x 40 mesh activated carbon. The outer screen of this cartridge was made with a porous plastic and serves to prefilter the water and to retain the loosely packed carbon in the cartridge. This cartridge measured 9¹⁵⁄₁₆ inches in length and had a diameter of 2¾ inches. The diameter of the inner core was 1⅛ inches. The center core was made of a rigid plastic screen with string wound along the plastic screen tube so as to provide a retainer for the carbon as well as a filter for the water.

Examination of the date of Table 4 indicates that the activated carbon cartridge of Example 9 was substantially more efficient in chlorine removal than that obtained with the filter cartridge C. For example, when the total flow through filter cartridge C amounts to 1,333 gallons, this cartridge was only able to remove about 45% of the chlorine content of the influent.

In summing up the data of Tables 1-4, it can be stated that the activated charcoal fluid treating cartridge of the present invention favorably compares to the relatively expensive and bulky cartridge A insofar as chlorine removal and pressure drop are concerned, and is at least equivalent to cartridge B in terms of chlorine removal but far superior thereto in view of pressure drop and very superior to cartridge C in chlorine removal.

EXAMPLE 10

The ion exchange resin cartridge of this example was composed of 94.7%, by weight, of ion exchange resin. In making this cartridge, 1,489 grams of 16 x 50 mesh cation exchange resin (sodium form), sold under the trademark "Ionac C-249," Clack Inc. were mixed with 41.7 grams of Simoniz prepolymer, 41.7 grams of Nopco prepolymer #H-101-N-T and 10 grams of the catalyst and cross linking agent "Quadrol" by a spatula in a polyethylene bucket for a few minutes. The mixture was then placed into a 36 inch long x 2½ inch I.D. Pyrex glass tube and steam passed therethrough for about 20 minutes. A cartridge was then made therefrom and tested for its water softening characteristics with city of Chicago water.

The data obtained with this cation exchange resin cartridge are tabulated below in Table 5. For comparative purposes, similar tests were made with a conventional 56.6 cubic inch loose bed cation exchange resin water softener, the data obtained therewith are set forth below in Table 6. Examination of Tables 5 and 6 illustrates that the cartridge of the present invention is more efficient than the loose bed cation exchange resin water softener, viz. 88% vs. 80%. In this regard, it should be noted that the very low pressure drop across the cartridge of Example 10 clearly demonstrates that the polyurethane matrix is not completely filling the interstices between the ion exchange resin beads.

TABLE 5.—DATA OBTAINED WITH CATION EXCHANGE RESIN CARTRIDGE OF THE PRESENT INVENTION (EXAMPLE 10)

| Total flow (gallons) | Flow rate (g.p.m.) | Water temperature, °C. | Pressure drop across cartridge (p.s.i.g.) | Hardness (grains per gallon) | |
|---|---|---|---|---|---|
| | | | | Influent | Effluent |
| 156 | 0.8 | 23 | 0.6 | 9.0 | 2.3 |
| 158 | 0.24 | 23 | 0.1 | 9.0 | 1.0 |
| 166 | 0.7 | 23 | 0.4 | 9.0 | 1.5 |
| 208 | 2.1 | 23 | 1.4 | 9.0 | 2.8 |

TABLE 6.—DATA OBTAINED WITH CONVENTIONAL 56.6 INCH LOOSE BED CATION EXCHANGE RESIN WATER SOFTENER

| Total flow (gallons) | Flow rate (g.p.m.) | Water temperature, °C. | Hardness (grains per gallon) | |
|---|---|---|---|---|
| | | | Influent | Effluent |
| 0 | 0.20 | 22.0 | 8.3 | 0.0 |
| 15 | 0.20 | 22.0 | 8.3 | 0.0 |
| 30 | 0.20 | 22.0 | 8.3 | 0.4 |
| 45 | 0.20 | 22.0 | 8.3 | 0.5 |
| 60 | 0.20 | 21.5 | 8.3 | 1.2 |
| 75 | 0.20 | 21.5 | 8.3 | 1.2 |
| 90 | 0.20 | 21.5 | 8.3 | 1.4 |
| 105 | 0.20 | 21.0 | 8.5 | 1.4 |
| 120 | 0.20 | 21.0 | 8.6 | 1.5 |
| 135 | 0.20 | 21.0 | 8.6 | 1.6 |
| 150 | 0.20 | 21.0 | 8.6 | 1.6 |
| 165 | 0.20 | 21.0 | 8.6 | 1.8 |
| 180 | 0.20 | 21.0 | 8.6 | 2.0 |
| 195 | 0.20 | 21.0 | 8.6 | 2.0 |
| 210 | 0.20 | 21.0 | 8.4 | 2.4 |
| 225 | 0.20 | 21.0 | 8.5 | 3.0 |
| 237 | 0.20 | 21.0 | 8.5 | 3.8 |

EXAMPLE 11

The ion exchange resin bead cartridge of this example was composed of approximately 96.5%, by weight, of ion exchange resin beads. In making this cartridge, 1,489 grams of 16 x 50 mesh exchange resin beads (sodium form) sold under the trademark "Ionac C-249," Clack Inc. were mixed with 28.4 grams of Simoniz prepolymer, 28.4 grams of Nopco prepolymer #H–102–N–T and 10 grams of "Quadrol" by spatula in a polyethylene bucket for a few minutes. The mixture was then packed into a 36 inch x 2½ inch I.D. Pyrex glass tube and steam treated for about 20 minutes. In testing this cartridge, it was found to have the same capacity and efficiency for hardness removal as did the cartridge of Example 10.

EXAMPLE 12

The fluid treating cartridge of this example was made by first combining 15 parts, by volume, of Nopco SX–159D with 7 parts, by volume, of water and 78 parts, by volume, of synthetic styrene beads (each of which being approximately 0.025 inches in diameter) with mixing so that all of the styrene beads received a uniform coating of the "SX–159D" prepolymer resin. Three drops of tetramethylbutyldiamine were then added and the mixture immediately transferred to an annular mold measuring 9⅞ inches in length and 2¾ inches in diameter. The central hollow core of the mold measured ¾ inches. The volume of the mold was approximately equal to the total volume of the above ingredients in their pre-reacted condition. The walls of the mold were fixed so as to maintain the aggregate particles in an abutting relationship.

The mold containing these materials was then placed in an oven at a temperature of 175° F. for about ½ hour after which time the polyurethane resin was cured. The filter cartridge was then removed from the mold and, after cooling to room temperature, tested as to effectiveness as a water softener. Data obtained from the testing of this filter cartridge favorably compared with that obtained with conventional equipment wherein identical styrene beads were loosely packed in a tubular casing.

EXAMPLE 13

This example illustrates the making of a fluid treating cartridge which is composed of a composite aggregate, viz. synthetic styrene beads, granulated charcoal and manganese greensand. In this example the terms "parts" refers to parts by volume. To 22 parts of Nopco "SX–159D" were added 10 parts water, 25 parts granulated charcoal (average grain size of from 0.025 to 0.05 inches), 25 parts synthetic styrene beads (average particle diameter being approximately 0.025 inches) and 28 parts manganese greensand (average particle diameter being approximately 0.020 inches). These materials were thoroughly mixed together so that all of the aggregate particles received a uniform coating of the "SX–159D" urethane prepolymer. Three drops of tetramethylbutyldiamine were then added and the mixture immediately transferred to an annular mold measuring 9⅞ inches in length and 2¾ inches in outer diameter. The central hollow core measured ¾ of an inch. The volume of the mold was approximately equal to the total volume of the above ingredients in their unreacted condition. The walls of the mold were fixed so as to maintain the aggregate particles in an abutting relationship.

The mold containing these materials was then placed in an oven at a temperature of 175° F. for about ½ hour after which time the polyurethane was cured.

The filter cartridge was then removed from the mold and, after cooling to room temperature, was tested on drinking water. Performance was satisfactory, thus establishing that the polyurethane matrix of the present invention can be effectively used in fluid treating cartridges in which a plurality of different aggregates are combined.

In the foregoing specification, a detailed description of certain embodiments of the present invention has been set forth for purposes of explanation. It will be apparent, however, that modifications and variations therefrom may be made by those skilled in the art without departing from the spirit and scope of this invention. Accordingly, only such limitations are to be imposed on this invention as are indicated in the appended claims.

We claim:

1. A method of making a fluid treating device having a porous body of abutting surface-active aggregate particles, the surface areas of which are substantially freely exposed, which aggregate particles are bound together by a polyurethane binder, said method comprising:
    (a) applying a liquid blowing agent to substantially cover the entire surface of a plurality of surface-active aggregate particles, said blowing agent being a material which when reacted with a urethane prepolymer produces gas generation;
    (b) combining the thus treated surface-active aggregate particles with liquid reactants which include a urethane prepolymer to form an aggregate-liquid reactant mass;
    (c) shaping said aggregate-liquid reactant mass into a desired product configuration by confining said mass in a product-shape defining mold, said aggregate particles while in said mold being in abutting relationship to each other, and said liquid reactants being used in amounts which will provide a polyurethane binder having a volume which is less than the interstitial volume between said abutting aggregate particles; and
    (d) reacting said liquid reactants and blowing agent to produce a polyurethane binder while simultaneously generating a gas at the surface of said aggregate particles by the chemical reaction of said blowing agent with said liquid reactants to separate the polyurethane binder from the surfaces of said aggregate particles which are thus bound together in abutting relationship to each other by said polyurethane binder in a unitary structure wherein the surfaces of said bound aggregate particles are rendered substantially free of said polyurethane binder by said gas generation to produce said porous fluid treating device.

2. The method of claim 1 wherein heat is added to said product-shaped aggregate-liquid reactant mass to expedite said chemical reaction.

3. The method of claim 1 wherein said blowing agent is water, the weight ratio of said surface active aggregate particles to water being approximately 1:1.

4. The method of claim 1 wherein said surface active aggregate particles are selected from the group consisting of activated charcoal, ion exchange resin beads and manganese greensand.

5. The method of claim 1 wherein said aggregate particles consist essentially of activated charcoal and said weight ratio of activated charcoal particles to liquid reactants ranges from about 24:1 to 2:1.

6. The method of claim 5 wherein said liquid blowing agent is water and the weight ratio of said water to activated charcoal particles is approximately 1:1.

7. The method of claim 1 wherein said aggregate particles consist essentially of ion exchange resin beads and the weight ratio of ion exchange resin beads to liquid reactants ranges from about 32:1 to 9:1.

References Cited
UNITED STATES PATENTS

| | | | |
|---|---|---|---|
| 3,375,933 | 4/1968 | Rodman | 210—510 |
| 3,025,233 | 3/1962 | Figert | 210—496 |
| 2,768,754 | 10/1956 | Briggs | 210—496 |
| 3,274,103 | 9/1966 | Adams | 210—75 |
| 3,166,615 | 1/1965 | Farrell | 264—128 |
| 2,961,710 | 11/1960 | Stark | 210—496 |

ROBERT F. WHITE, Primary Examiner

J. R. HALL, Assistant Examiner

U.S. Cl. X.R.

264—45, Dig. 17